(12) United States Patent
Howsam (10) Patent No.: US 6,817,858 B2
(45) Date of Patent: Nov. 16, 2004

(54) MULTI-CHANNEL COOLING DIE (75) Inventor: Stuart Howsam, Wodonga (AU)

(73) Assignee: Mars Incorporated, McLean, VA (US)

( * ) Notice: Subject to any disclaimer, the term of this patent is extended or adjusted under 35 U.S.C. 154(b) by 194 days.

(21) Appl. No.: 10/169,660

(22) PCT Filed: Jan. 8, 2001

(86) PCT No.: PCT/AU01/00011
§ 371 (c)(1),
(2), (4) Date: Nov. 7, 2002

(87) PCT Pub. No.: WO01/49474
PCT Pub. Date: Jul. 12, 2001

(65) Prior Publication Data
US 2003/0143295 A1 Jul. 31, 2003

(30) Foreign Application Priority Data
Jan. 7, 2000 (AU) ............................................. PQ 4992

(51) Int. Cl.⁷ ............................................. B29C 47/88
(52) U.S. Cl. ............................. 425/378.1; 425/382 R; 425/464
(58) Field of Search ............................. 425/378.1, 71, 425/380, 464, 382 R (56) References Cited
U.S. PATENT DOCUMENTS 506,556 A * 10/1893 Sharpe ........................ 172/472
2,638,855 A * 5/1953 Donato ........................ 425/464
5,238,376 A 8/1993 Figuereo
6,066,288 A 5/2000 Purstinger

* cited by examiner

Primary Examiner—Tim Heitbrink
(74) Attorney, Agent, or Firm—Fulbright & Jaworski LLP (57) ABSTRACT A cooling die for extruding of high moisture extrudate food products having a cooling die body in which are defined a plurality of extrudate flow channels extending between an inlet end of the cooling die that is attachable to an extruder and outlet end for delivery of cooled-down extrudate, and coolant cavities located in heat-exchanging communication with the extrudate flow channels and connectable to a source of coolant, characterized in that the cooling die body consist of a plurality of thick plates having first and second channels extending between and opening at the planar surfaces of the thick plates, and that the plurality of thick places are stacked and fastened together such that the opening of the first and second channels of adjoining plates are respectively aligned with one another, whereby the first channels form said plurality of extrudate flow channels and the second channels form a plurality of discrete coolant channels extending through the length of the cooling die body.

23 Claims, 6 Drawing Sheets

MULTI-CHANNEL COOLING DIE

FIELD OF THE INVENTION

This invention relates to cooling dies for use in association with food extruders in the manufacture of texturised protein food products, and a perforated die plate for use at the cooling die outlet.

In particular, the present invention relates to a cooling die for use in the manufacture of an extrude food product that has the appearance of fibrous meat pieces such as fish, chicken, lamb or beef. The cooling die is attachable to the outlet of an extruder which may contain one or more screws and feeds molten extrudate to said cooling die at a temperature between 110° and 180° C.

BACKGROUND OF THE INVENTION

Various protein texturisation processes have been used for some time in the manufacture of various food product, such as in the manufacture of sausages, cheese curds, mozzarella processed cheeses, bakery products, tofu, kamaboko, meat analogs and seafood analogs. A fibrous texture may be obtained by various means, including extrusion cooking at low moisture levels (typically 10–30% by weight).

Extrusion cooking at high moisture levels (e.g. typically 30 to 80% water by weight) is a relatively new technique which is finding use mainly in the field of texturisation of protein food products.

High moisture extrusion cooking has been discussed as a means of restructuring various natural protein sources, such as fish mince, surimi, de-boned meats, soy flours, concentrates, cereal flours, dairy proteins and the like, in order to obtain cohesive fibrous or lamellar structures (e.g. see "New Protein Texturisation Processes by Extrusion Cooking at High Moisture levels" by J C Cheftel et al, Food Reviews international, 8 (2), 235–275 (1992) published by Marcel Dekker, Inc.).

Unlike low moisture extrusion cooling, high moisture extrusion cooking requires the use of cooling dies for cooling, gelling and/or solidifying the food product issuing from the food extruder. A cooling die dissipates the thermal and mechanical energy accumulated in the food mix, increases the viscosity of the mix, and prevents product steam flash at the die outlet The concept of extruding cereal, meat or other protein blends at high moisture through an extruder and then passing the extrudate through an attached cooling die, so that product exits the cooling die at temperatures not exceeding 100° C. (typically about 80° C.), is not a new one. This cooling of the product is quite important in order to eliminate expansion of said product as a consequence of steam flashing, amongst other things. There are numerous patents and articles discussing this subject, including discussions of die design in particular.

It is understood that texturisation of the protein food product takes place during cooling as a result of lamellar flow in the die.

Three main types of cooling dies are known for use in this field of technology/application. Most commonly known are elongated rectangular cooling dies. A rectangular cooling die has a long rectangular prismatic housing in which is received a rectangular duct extending along the length of the die. The regions surrounding the rectangular cavity (duct) are cooled with water thereby enabling the extruded food product passing through to be cooled. Cooling dies may also be cylindrical with an internal cylindrical cavity extending along the length thereof. Such a cooling die functions in much the same manner as a rectangular cooling die. There are annular cooling dies in which the internal cavity has an annular cross-section defined by an inner core and an outer cylinder. The inner core and outer cylinder are cooled, thereby enabling the food product passing through the cavity to be cooled.

One problem with known cooling dies is that, as portions of the food product come in contact with the coded surfaces of the die, these portions become thicker, tend to stick to the surface of the die and slip at a lower rate than internal sections of the product Accordingly, velocity gradients and shear forces develop which may cause inconsistencies in the food product and problems with the smooth continuous operation of the cooling die and extruding apparatus. This is a particular problem where the dimensions of the cooling die cavity (e.g. height, width and/or length) have been increased so as to achieve greater throughput of extruded products.

Another problem with known cooling dies is that they effectively cause a "bottle-neck" in the extrusion process. Typically, the capacity of a commercial cooling die is about 100 kilograms per hour, so that product output is limited to this value.

Whilst this extrusion rate has been found to be desirable in order to achieve a commercially acceptable product, it is desired to have greater product output rates to increase yields. The production of high moisture extruded products at manufacturing outputs of up to 200 kg/hr using single channel cooling dies has also been documented. However, extruded products manufactured at these rates tend to be of lower quality and/or consistency than those manufactured at lower rates. Production rates in excess of 200 kg/hr are much more difficult to achieve, due to the physical limitations of known cooling die designs.

The output of a cooling die is determined by a multitude of factors, one major factor being the capacity (of volume) of the cooling die cavity (or channel) which is determined by the cross-sectional area and the length of the die cavity, it increased production rates are required, one has the choice of increasing the cross-sectional area or die length or both. This strategy however may be limiting. For instance, the cross-sectional area of the die cavity is largely determined by the desired product characteristics. Also, increasing the cross sectional area would typically increase the amount of time required to cool the product. It may result in inconsistencies in the product due to the outer portions of the extruded product cooling much faster than the inner portions. Altering the die shape may give a product not meeting desired visual parameters. Increasing the length of the cooling die also has limitations due to the fact that the pressure drop along the die is proportional to the length of the die. Increasing the pressure drop along said cooling die will decrease output of the die or require increased extruder capabilities.

Attempts have also been made to increase the capacity of cooling dies through the use of higher flow rates with cooling dies of greater cross-sectional areas. This measure necessitates longer cooling dies. This has a number of adverse consequences. For instance, longer cooling dies increase the likelihood of inconsistencies arising in the food product and structure blockages occurring in the cooling die. Also, such dies obviously take up more area or floorspace of the production plant, which in turn increases costs.

Japanese patent application No. 4-214049 (publication No. 6-62821) discloses a multi-channel cooling die which is used in the extrusion of thin, thread-like food products from high moisture content proteinaceous raw materials. The cooling die is essentially constructed like a typical shell-and-tube heat exchanger, wherein the shell covers at the axial ends of the cylindrical shell are replaced with purpose built end plates. The inlet end plate is flanged to the extruder's die plate holder, while the other end plate is similar in layout to the stationary tube sheet of the heat exchanger, i.e. a multiple-orifice plate in which the ends of the plurality of inner tubes are wedged and supported.

The plurality of thin-walled inner tubes employed in such typo of cooling die ensure efficient cooling at higher through-put rates of extrudate. It is said that the individual tubes possess high pressure resistance thereby enabling processing of greater amounts of raw materials as compared with conventional, single cavity cooling dies.

One serious shortcoming of such type of cooling die is the need to use "pigs" or long rods for cleaning the individual inner tubes through which the extrudate flaws during processing. The smooth surface of the tubes can be damaged during the cleaning process (due to their length), which may result in irregular loading of individual tubes from the extruder as a consequence of increased surface roughness (and back pressure) at individual tubes. Also, in case one of the tubes is damaged to an extent that it no longer provides a flow path for the molten extrudate. It is necessary to replace the entire cooling die or perform a time and labour intensive replacement process: because the individual tubes are received in airtight manner at the end plates of the cylindrical shell, all tubes have to be removed and refitted in order to exchange any one of them.

SUMMARY OF INVENTION

The present invention is directed to providing a cooling die for use with a food extruder, which enables greater manufacturing output without substantially increasing the cross-sectional area or length of the extrudate flow cavity, when compared to single cavity cooling dies used in the art, by providing a multi-channel cooling die which addresses some or all of the disadvantages perceived to exist with shell-and-tube type cooling dies.

The present invention also seeks to provide a cooling die which incorporates means to enable extrusion of extrudates of varying cross-sectional shapes/sizes without the need to stop extrusion of the product.

According to a first aspect of the invention there is provided a cooling die for extruding of high moisture extrudate food products, having a cooling die body in which are defined a plurality of extrudate flow channels extending between and inlet end of the cooling die that is attachable to an extruder and an outlet end for delivery of cooled-dawn extrudate, and coolant cavities located in heat-exchanging communication with the extrudate flow channels and connectable to a source of coolant, characterised in that the cooling die body consist of a plurality of thick plates having a plurality of first and second bores extending between and opening at the planar surfaces of the thick plates, and in that the plurality of thick plates are stacked plane-parallel and fastened together such that the opening of the first and second bores of adjoining plates are respectively aligned with one another, whereby the first bores form said plurality of extrudate flow channels and the second bores form a plurality of discrete coolant channels extending through the length of the cooling die body.

Such type of cooling die layout has a number of advantages over the above described shell-and-tube cooling die. Firstly, the stacked arrangement of individual plate members allows assembly of cooling dies of varying length by removing or inserting individual plate members, thereby providing adaptability to different cooling requirements of the extrudate. Secondly, the extrudate flow channels are easier to clean without risk of damage, as the die body can be easily dismantled thereby to provide access to the relatively short bores formed in the individual plate members. Conventional sealing elements and/or mean are provided between the individual plate members thereby to ensure formation of leak proof and pressure resistant channels extending between the axial ends of the die body assembly once the plates have been stacked and secured to one another.

There are numerous ways in which the stack of plate member can be secured to form a unitary die body, including fastening of adjoining plate members through suitable fasteners (i.e. recessed screw/nut fasteners), clamping of the entire stack of plates between end plates which are tensioned using threaded rods or the like, and similar. Also, alignment elements may advantageously be present between each pair of adjoining plates to ensure coaxiality of the openings of the first and second bores of the plates with one another. There are numerous ways in which the plates can be fastened and aligned with one another, as is the case with sealing mechanisms to provide leak-free passage of extrudate and coolant through the respective channels in the cooling die body. These am known to the competent tool making engineer.

In a preferred form of cooling die in accordance with the present invention, there are provided a coolant supply and a coolant discharge end plate at axially opposite ends of the cooling die body, wherein the end plates include manifold conduits for supplying or discharging coolant to/from the coolant channels of the die body, as the location of the end plates dictate. Advantageously, the manifold conduits communicate with a common coolant supply/discharge armature fixed to the respective end plate for connecting the manifold conduits to a source of coolant or a receptacle reservoir, as the case may be. One manifold conduit may be arranged to supply or receive coolant from one or a plurality of coolant channels, the latter being grouped in fluid communication in sets of two or more channels in order to decrease individual connection points between manifold conduits and coolant channels. Extrudate flow bores will also be present in both end plates, to allow entry and exit of extrudate into thee cooling die body plates The extrudate flow channels of the die body may be orientated in any suitable manner and extend either axially through the body or in a helical pattern or the like. In case of co-axially arranged extrudate flow channels, these may be arranged in a regular or irregular pattern of rows or columns, in a preferred embodiment the extrudate flow channels being located radially about the longitudinal axis of the cooling die body.

In a preferred form, the cooling die longitudinal axis is disposed in alignment with the axis of the extruder to which the former is connected in use.

In one preferred form, the cooling die body contains twenty-four (24) extrudate flow channels equidistantly spaced about the axis of the die, The arrangement of extrudate flow channels in a pattern that is equidistantly spaced about the axis of the die with each channel having a cross-section opening which extends substantially in radial direction, has several advantages, including efficient use of space, ease of manufacture of the individual plate members and optimal packaging density. This arrangement also allows to interleave one or more coolant flow channels between neighbouring extrudate flow channels.

In a preferred form, the extrudate flow channels will have an oblong or long-hole cross-section (i.e. rectangular shape with rounded short ends) thereby to prevent sharp edges in which extrudate could deposit and adhere. Each extrudate flow channel will have a radial height which is substantially greater than the width thereof (i.e. dimension in peripheral direction of the cylindrical die plates). The height of each channel is preferably greater than 20 mm and typically about 70 mm, whereas the width would be about 4 mm or more, preferably about 8 mm. It will be appreciated that other cross-sectional shapes may be used instead of substantially rectangular cross-sections, bearing in mind that different cooling requirements apply to different cross-sectional shapes of extrudate flow channels.

A noted above, it is preferred to have an alternating arrangement of coolant and extrudate flow channels, wherein it is advantageous to have two or more radially spaced coolant channels extended between two neighbouring extrudate flow channels, thereby to increase heat transfer from the extrudate into the coolant. A radially symmetrical arrangement of coolant and extrudate flow channels about the longitudinal axis of the cooling die body is preferred.

Due to the operating pressures and temperatures, the thick plates that make up the cooling die body will be machined from solid metal, e.g. Stainless steel, aluminium and the like.

In a further development of the present cooling die invention, there is incorporated an extrusion die plate at the outlet end of the cooling die body downstream of the coolant discharge header plate (also referred to as a distribution end plate) the extrusion die plate having a plurality et discharge orifices of predetermined shape and configuration that are grouped and arranged to be selectively bought in axial alignment with predetermined ones of the extrudate flow channels thereby to enable extrusion of cooled-down extrudate bands having selected ones of different cross-sectional shapes in accordance with the discharge orifice shape.

Incorporation of such type of cooling die extrusion plate allows extruding of extrudate bands having selected cross-sectional shapes through a single extrusion plate by simple repositioning of the extrusion die plate at the cooling die outlet end. This in turn enables to increase efficiency of the extruder cooling die assembly, as the need to shut down the extruder (often for a few hours) in order to exchange a die extrusion plate is avoided.

In a preferred form of extrusion die plate, the number of discharge openings is a natural multiple of the number of extrudate flow channels, wherein the respective multiples are grouped together such that one group can be brought into alignment with the extrudate flow channels, whilst the other group is offset therefrom, the first group of discharge orifices having a cross-sectional shape that is different from that of the second group. Alternatively, the discharge orifices may all have the same cross-sectional shape and selected ones of the openings may be traversed by a predetermined number of cutting blades, wires or webs thereby subdividing the respective orifice into a corresponding plurality of smaller openings.

Preferably, the extrusion die plate is arranged to move between a first position in which the orifices featuring the cutting elements align with a selected number of the extrudate flow channels, and a second position, in which the orifices featuring the cutting elements do not align with the channels. A benefit of this embodiment is that one can selectively have extruded product exiting the cooling die either as wide strips (i.e. where the extrusion die plate orifices have an oblong or rectangular cross-section corresponding to that of the extrudate channels) or as "strings" (for instance, having squarish cross-sections), simply by moving the die plate (or screen) from the first position to the second position. Rapid change of the extrusion die plate position at the outlet of the cooling die results in less down-time and less wastage of product, which thereby results in considerable cost savings.

When the multi-channel cooling die is a "radial" cooling die (having extrudate flow channels arranged equidistantly about the axis of the die body and each having a substantially radial extension), extrusion die plate is preferably disc-shaped and rotatable about the central axis of the assembly. The circular plate may be moved between the first position and the second position simply by rotating it. The plate may have sets of orifices featuring cutting elements adapted to align with each of the extrudate flow channels and "open" orifices between each of the sets of apertures featuring cutting element. When the set of cutting elements are aligned with the extrudate flow channels, the product exiting the cooling die will be cut by the cutting elements so as to form "strings" of extruded product Where, for example, the cooling die has twenty four equi-peripherally spaced extrudate flow channels, the extrusion die plate may have a corresponding twenty four orifices with cutting elements and twenty four "open" orifices. By rotating the plate or screen through 7.50°, the plate is moved from the first position, in which the set of apertures featuring cutting elements align with the extrudate flow channels, and the second position, in which the "open" apertures align with these channels.

Alternatively, in the case of a twenty four channel cooling die, the cooling die extruder plate or screen may have twelve apertures featuring cutting elements and twelve "open" apertures. In this case, an additional "shutter" plate would be preferably located at the inlet end of the stacked die body, to selectively shut 12 of the extruder flow channels so that product would only be permitted to pass through the other twelve of the channels; the apertures featuring cutting elements, or the open apertures would, selectively, be in alignment with these open twelve channels. The apertures featuring cutting elements or the "open" apertures which are not in use would be in alignment with those channels through which no product is passing, As will be appreciated, provision of such variable cooling die extruder plate requires that the cooling die end (or coolant distribution) plates at each and of the cooling die body are designed with axially extending sack holes for the coolant channels of the die. The sack holes are then in communication with the radially extending bores that terminate in the peripheral surface at suitable fitting that enable connection to coolant manifold lines. Accordingly, the cooling fluid will not flow axially past the end plates of the cooling die.

The cooling die may further be associated with a cutting apparatus that includes cutting means for cutting the strips or lengths of the extrudate exiting the cooling die extrusion plate into pieces of desired length. This cutting means may be a rotatable blade. Preferably, the cutting apparatus further includes means for varying the speed at which this blade rotates. By varying this speed, the length of pieces of the product being cut can thereby also be varied.

A preferred embodiment of the invention is described below with reference to the accompanying drawings and by way of example only. Further advantages and preferred features of the invention are discussed there also.

DETAILED DESCRIPTION

In order to produce extruded food product such as fibrous meat analogues, one requires an extruder with the ability to impart shear and pressure on the ingredient formulation and convey said material to the cooling die. The extruder may contain one or more screws. These are well known and will not be described here.

Figure 1:
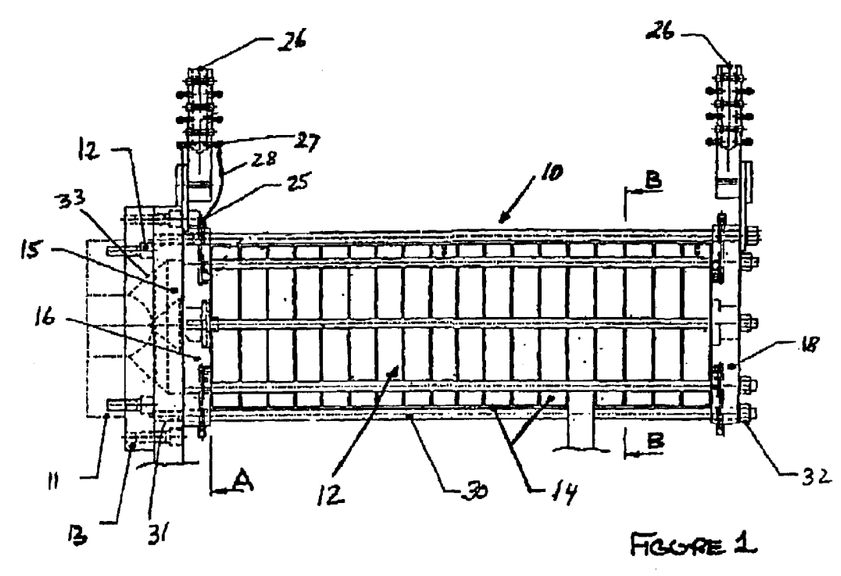
FIG. 1 is a plan side view (schematical) of a first embodiment of the cooling die showing its overall layout.

A cooling die assembly, in accordance with the invention, for use al the delivery end of a high moisture proteinaceous food extruder, is shown schematically in FIG. 1. The die assembly 10 essentially comprises a multi-piece die body 12 consisting of a plurality (here: 18) of disc-shaped thick steel plates 14 of identical layout, a coolant (i.e. cooling fluid) inlet header (or distribution) plate 16 at the axial inlet end of the die body 12, a coolant outlet header (or distribution) plate 18 at t axial outlet end and connection and transition structures for securing die 10 to a receptacle flange at the extruder outlet (notionally represented at dotted line 11) and clamping of the individual die body plates 14 together.

Figure 3:
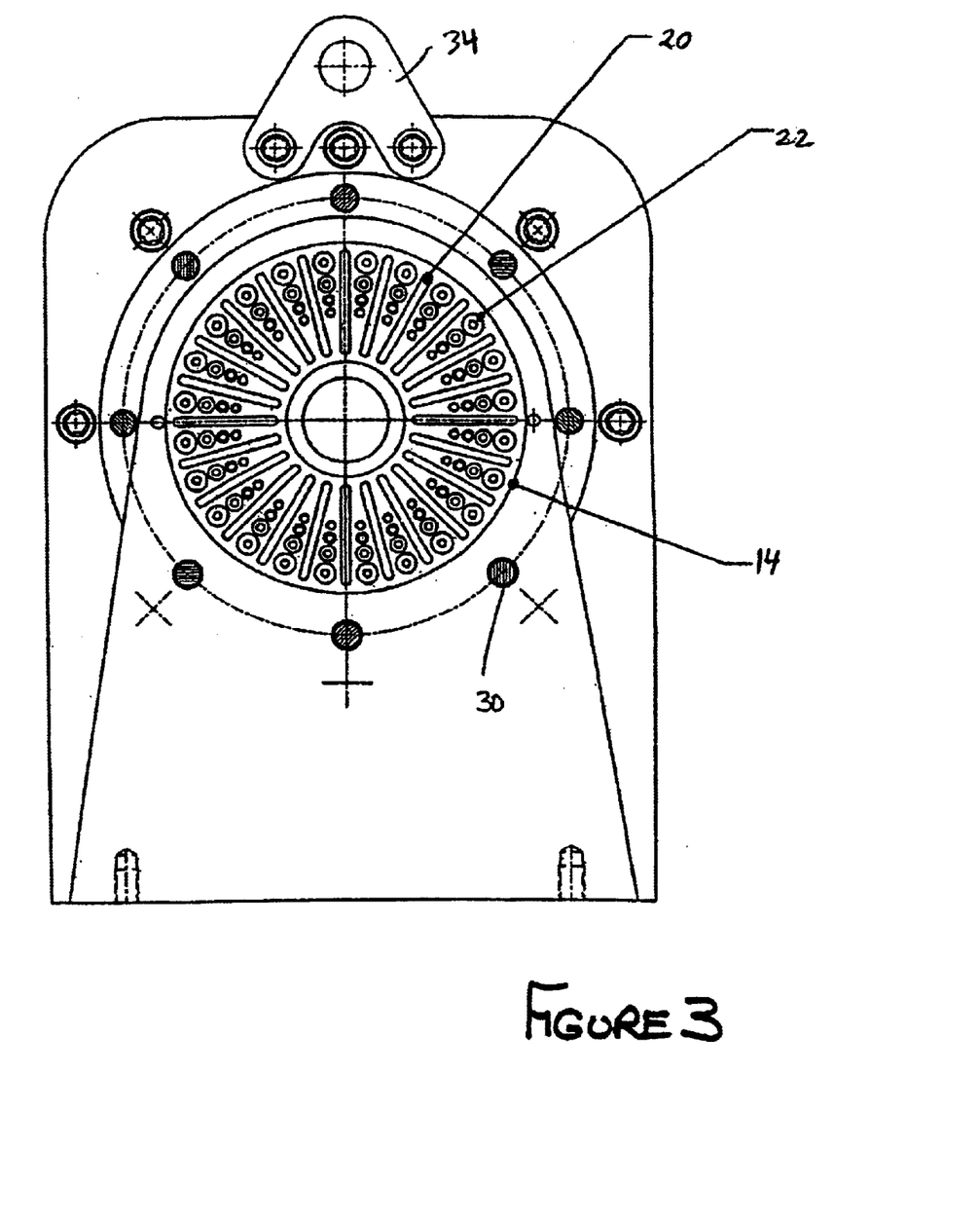
FIG. 3 is a cross-section of the cooling die of FIG. 1 at line B—B. showing the arrangement of extrudate flow channels and the coolant flaw bores.

A total of twenty-four extrudate tow channels extend axially and parallel to one another between the inlet end of die body 12 and the outlet end thereof, partial sections of the extrudate flow channels being defined by bores or "part channels" extending through each of the plate members 14 that make up die body 12. FIG. 3 illustrates in cross-section one of the cooling die plates 14 which, when stoked and clamped together, form cooling die body 12. The bores that make up the extrudate flow channels are identified at 20. The cross-section of the extrudate flow channels 20 is identical and about rectangular with rounded edges (or in the form of long holes/oblong). The major dimension or height of the channel 20 extends in a substantially radial direction from the central axis of to die body 12, and is at least 2.5 times the width thereof. The twenty-four extrudate flow channels 20 are equi-distantly spaced in circumferential direction of the plate members 14.

As can be further gleaned form FIG. 3, a plurality of bores 22 are machined into and extend through each die body plate 14 in a regular pattern an located between neighbouring extrudate flow channels 20, a total of four radially spaced apart bores being provided per row. When the individual die plates 14 are stacked, these bores 22 form a plurality to coolant flow channels which extend parallel to one another between the product inlet and outlet ends of die body 12, As noted above, at each end of cooling die body 12 are located cooling fluid (i.e. coolant) header plates 16, 18 which provide the terminal ends for the coolant flow channels 22 at the product inlet and outlet sides of the die assembly 10. These are in essence mirror-identical to one another, the only difference being their location with respect to extrudate flow through the cooling die, i.e. inlet and outlet end plates. Because these end plates 16, 18 also perform a function of distributing coolant from a single source to the individual coolant flow channels 22 of the die plate assembly 12, or receiving such coolant, they are here also referred to as distribution (end) plates 16, 18. Only one will be described in more detail.

Figure 2:
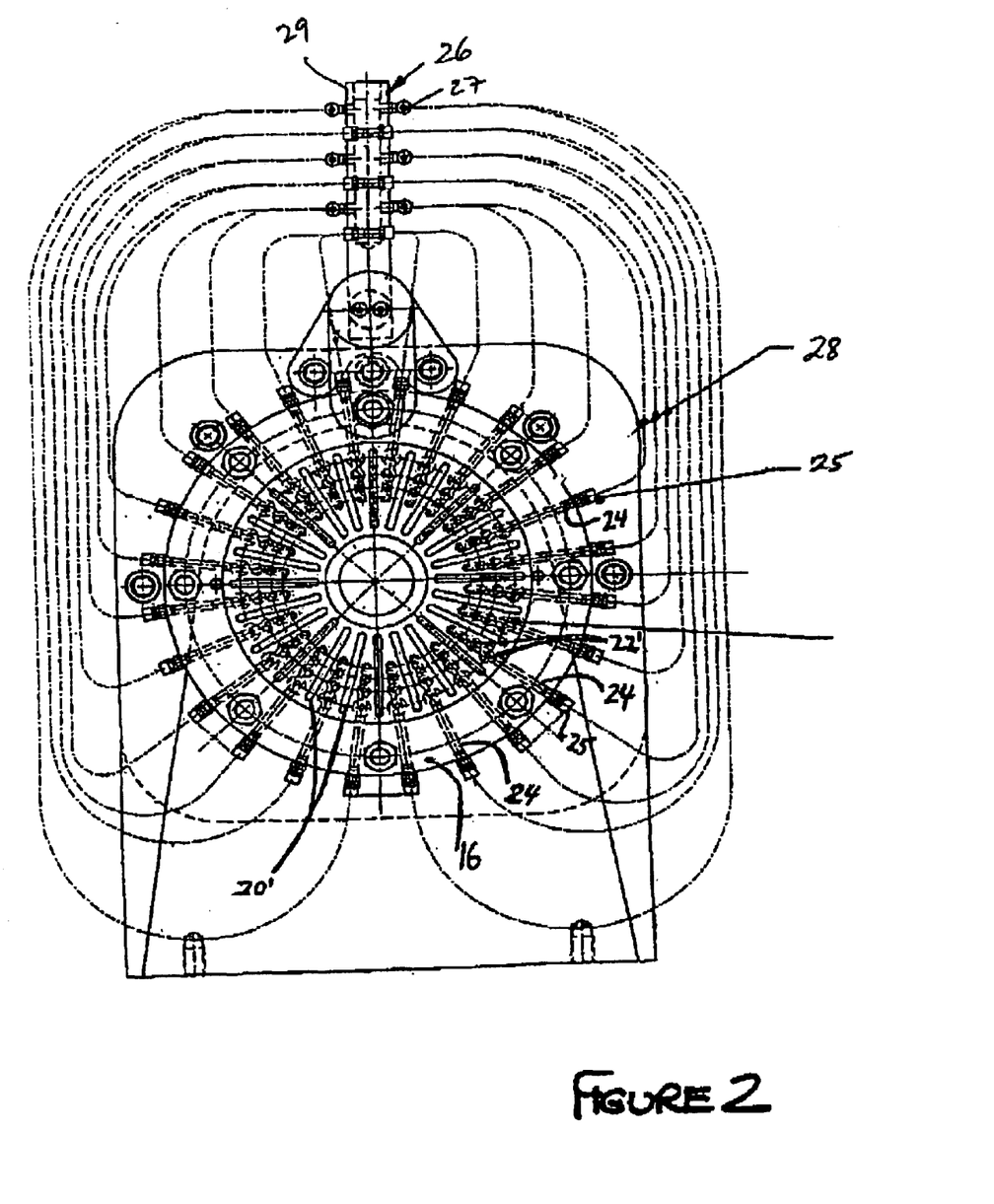
FIG. 2 is a cross-section of the cooling die of FIG. 1 at line A—A, showing detail of the cooling fluid path at the end (coolant distribution) plate of the cooling die plate stack.

As can be seen from FIG. 2, which illustrates schematically and in cross-section one such coolant header plate 16, a total of twenty-four radially extending coolant supply/discharge bores 24 extend from respective coupling armatures 25 located at regular intervals along the peripheral surface of the disc-shaped distribution plate 16 towards the centre thereof and terminate with distance thereof. Each supply/discharge bore 24 is in fluid communication with a total of four coolant flow bores 22' machined from one side only axially into the distribution plate 3. The sack bores 22'0 are shaped to correspond in cross-section, arrangement pattern and location with the coolant flow channels 22 provided in the cooling die plates 14 (compare FIG. 3), with whom they align when the plates 14, 16, 18 are stacked.

As can be further seen in FIG. 2, the distribution plate 18 (as well as 18) also has twenty-four long holes 20' which are arranged in a pattern and have a size corresponding to that of the extrudate flow channels 20 of the cooling die plates 14 (and cooling die body 12) with whom these align when the die is assembled.

A coolant distribution manifold structure 26 incorporates a total of twelve coupling armatures 27 fastened to a common supply/discharge tube 29. Tube 29 is secure/fixed vie bracket 34 to the upper side of distribution plate 16 (and 18) or any other suitable component of the cooling die assembly. A total of twenty-four coolant lines 28 connect the coupling armatures 25 and 27 thereby to allow manifold feeding of coolant through a single inlet to the twenty-four individual coolant supply ducts 24 at the inlet end plate 16. The same configuration is present at the outlet end distribution plate 18. It is immediately apparent that direction of flow of coolant can be either in line with the direction of extrusion of materials passing through the extrudate flow channels 20 or in counter-flow from the product outlet end to the inlet end of the cooling die assembly 10. In other words, the fluid distribution plates 16 and 18 also serve as "entrance" and "exit" gates of the extrudate product, as well as for the distribution of cooling fluid.

Not shown in any detail in the accompanying drawings, it is evident that suitable alignment elements/members will be provided on the individual cooling die plate members 14 thereby to allow co-axial alignment of the respective bores 20, 22 which make up the extrudate flow channels and coolant flow channels. By the same token, suitable sealing elements will be provided thereby to ensure leak-free connection between the bores 20, 22 of adjoining die plate members 14 when these are stacked together and clamped together. Such sealing elements may include unitary gaskets received in a recessed zone surrounding the individual bores 20, 22. Hereagain, the competent cooling die tool maker has available to him/her a number of different options known in the art.

FIG. 1 illustrates one manner in which the die plate members 14 and the distribution end plates 16, 18 can be clamped together to form a unitary cooling die body 12. To this end, a total of eight tie rods 30 are provided. These extend parallel to one another and are evenly spaced about the axis of the assembly. One of the threaded ends of tie rods 30 screws into threaded fastening holes 31 provided at transition plate 15 at the inlet side of cooling die assembly 10, whereas the other threaded end extends through holes in the distribution (end) plate 18 at the product outlet side of cooling die assembly 10 and are secured thereat using nuts 32. This arrangement allows for clamping of the stacked plate assembly together in leak-tight manner.

Not illustrated in greater detail in FIG. 1, transition plate 15 incorporates flow distribution means thereby to ensure that extrudate received from the extruder outlet is evenly distributed to the extrudate flow bores 20' at the inlet distribution (end) plate 16 of cooling die assembly 10. The extrudate distribution means are illustrated schematically at dotted line 33.

In use of the production facility, molten lava (i,e, extrudate) from the extruder flows through extruder outlet into attachment flange piece 13 and through extrudate distributor (i.e. transition) plate 15 before passing though coolant distribution (end) plate 16 and entering the first of the cooling plate members 14. The flow of extrudate is evenly distributed over all product channels 1 due to all product paths being of similar lengths. However, if necessary, a restriction may be placed between transition plate 15 and the inlet-side cooling fluid distribution plate 16 in order to induce a pressure drop. This restriction is normally not required but may be added if even product flow from all channels is critical. Once the extrudate has entered the first of the stacked cooling plates 14 it conveys along the extrudate flow channels 20 formed by individual cooling plates attached together before exiting the cooling die via the outlet cooling fluid distribution plate 18. The total number of cooling plates 14 may be varied according to the heat transfer area required for the specific product Thermocouples may be inserted into the cooling plates at specially prepared points if required, to control the process.

As mentioned previously a restriction plate may be used in conjunction with the cooling die assembly 10 so that overall product velocity distribution is minimised. In a further development of the invention, a cooling die extrusion plate having a plurality of discharge orifices can be incorporated at the outlet end of the assembly. Molten, cooled-down lava is pressed through the orifices and, due to the pressure drop across said plate, partially solidifies. Product produced from such an arrangement has a partially cut appearance caused by the breakup of the molten lava into multiple flow paths that are not able to reform into a homogeneous mass downstream of the restriction plate. Product ensuing from the cooling die may subsequently be cut up by simple mechanical cutting devices attached directly to the final face of the cooling die. The product produced is regular in size but irregular in shape and resembles quite closely places of cut neat.

FIGS. 4–8 illustrate different views of a cooling die in accordance with the invention which incorporates a cooling die extrusion plate assembly at the outlet end of the cooling die body thereby 10 enable extrusion of differently shaped extrudates without the need for exchanging of the discharge end plate. The cooling die assembly 10 is substantiality similar to that described with reference to the FIGS. 1–3 and, accordingly, the same reference numerals are used to denote similar component parts. It will be noted that the inlet end of the cooling die assembly 10 is located at the right hand side in the illustration of FIG. 4 (instead of the left hand side in the illustration of FIG. 1).

Figure 4:
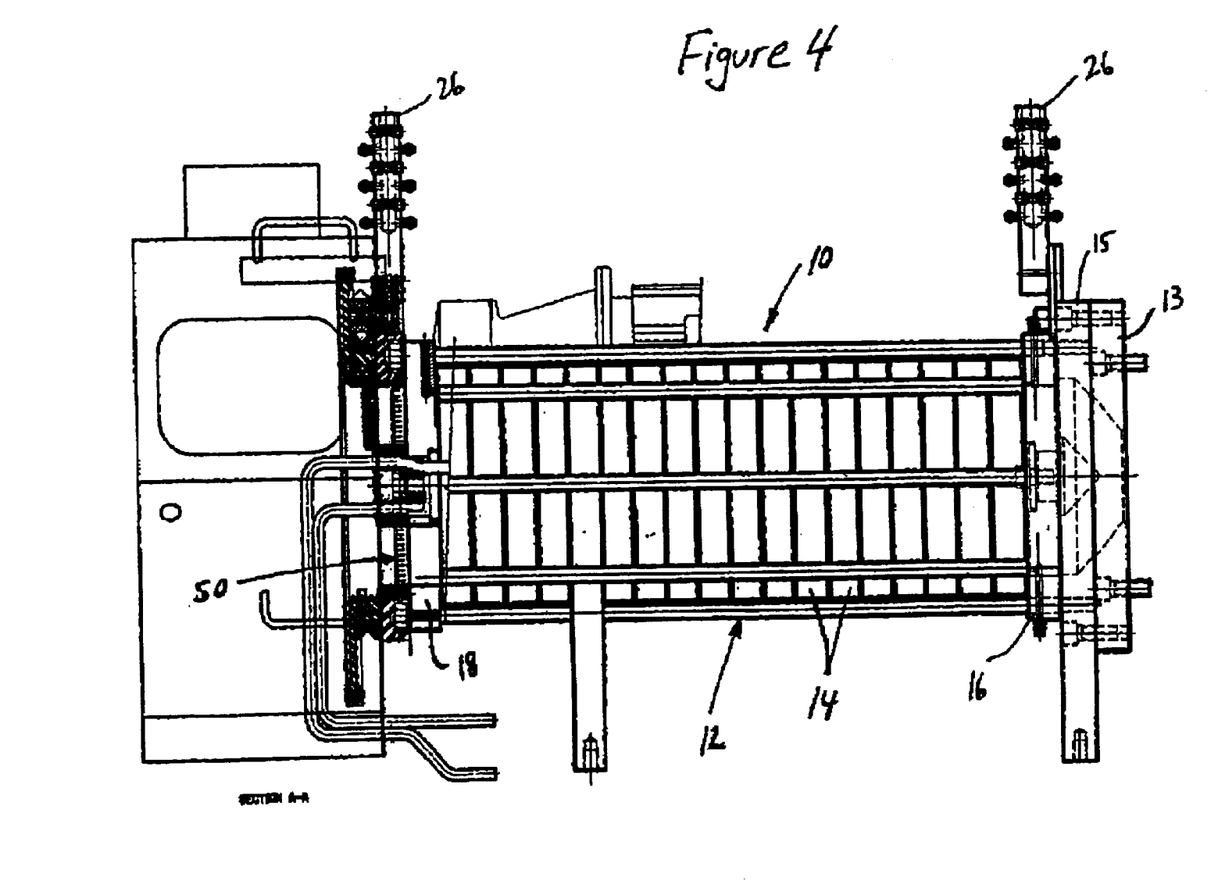
FIG. 4 is a plan side view (schematic) of a further embodiment of a cooling die in accordance with the invention, incorporating a cooling die extrusion plate.

The cooling die extrusion plate assembly is generally identified at reference numeral 50 in FIG. 4 and essentially consists of an annular steel plate 51 (see FIGS. 6 and 7) incorporating a total of twenty-four long holes 52 and 54 which pass through the thickness 91 plate 51 and extend in a generally radial direction from the centre of plate 51. Shape, size and location of the discharge orifices 52, 54 is predetermined by that present in die plate members 14 that make up the cooling die stack 12. Discharge orifices 52 and 54 are identical in shape but for the provision of an array of eleven mounting slots 55 that extend perpendicular to the height (i.e. radial extension) of orifices 54. These slots 55 are machined into one surface only of plate 51 thereby to terminate with distance from the opposing surface. These slots 51 serve to receive in form, fitting manner non-illustrated cutting blades which traverse the orifice 54 and thereby subdivide its main extension into discrete radial lengths. Accordingly, whilst extrudate passing through orifices 52 will have a generally band-like cross-sectional shape, the presence of the cutting knives in discharge orifices 54 will cut the extruding band into individual threads of substantially square cross-section.

Extrusion die plate 51 is received in a multi-piece support assembly 60 which is flanged to the outward facing side of the product discharge end of coolant distribution (end) plate 18 thereby to allow rotation of discharge plate 51 about the longitudinal axis of the cooling die-extrusion die plate assembly. The respective location and relative positioning of discharge orifices 52, 54 and the extrudate flow channels 20' at the end plate 18 is such that in a first position of the extrusion die plate 51 only extrusion orifices 52 will align with correspondingly associated ones of me extrudate flow channels 20 of the die assembly 12, whereby, in the illustrated embodiment having twenty-four orifices 52, 54. half or them will allow passage of extrudate through, whilst the other twelve will be offset with respect to the other extrudate flow channels 22 of the die assembly 10 and can be shut. Accordingly, it is possible to change the shape of the extrudate ribbon by rotating the extrusion die plate 51 from a position in which the discharge orifices with blades are online, to a position where the "open" orifices 52 (i.e. those without tranversing blades) are in alignment with the discharge openings at the end plate of the assembly.

Figure 5:
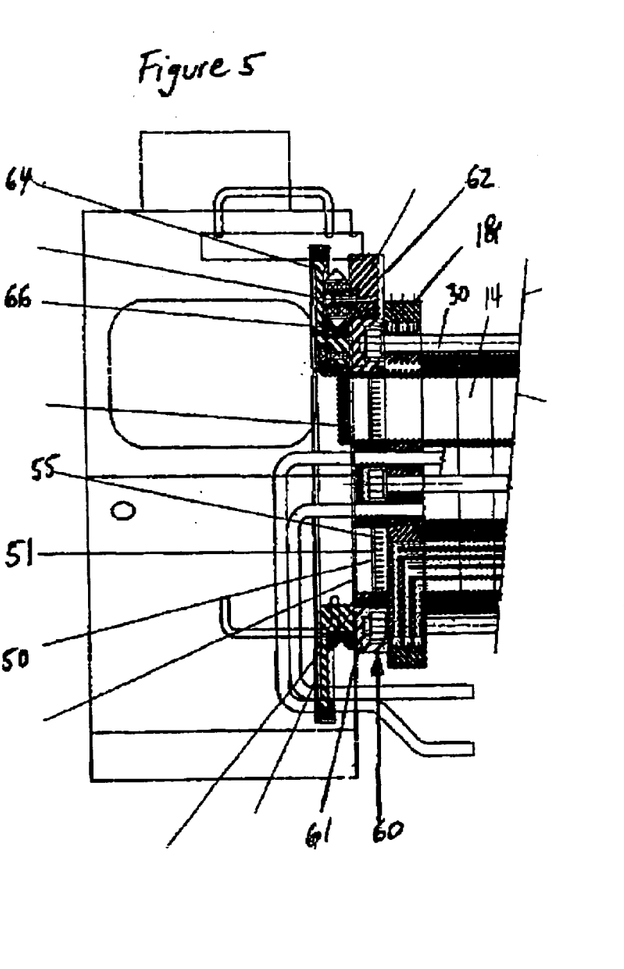
FIG. 5 is an enlarged detail view of FIG. 4 at the cooling die extrusion plate end.
Figure 6:
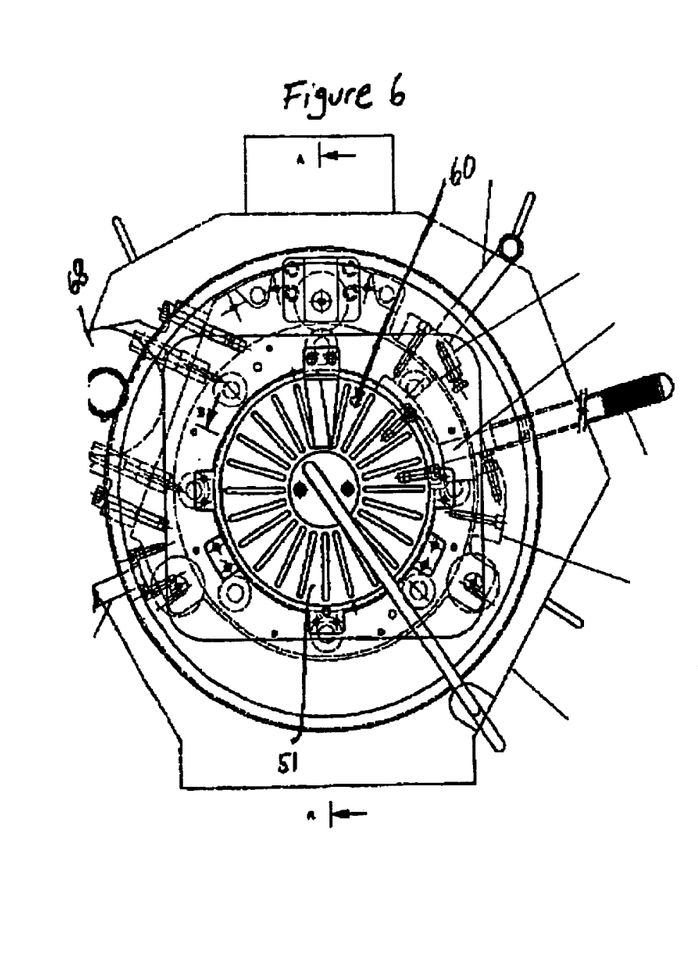
FIG. 6 is an elevation of the outlet and of the cooling die of FIG. 4.
Figures 7, 8:
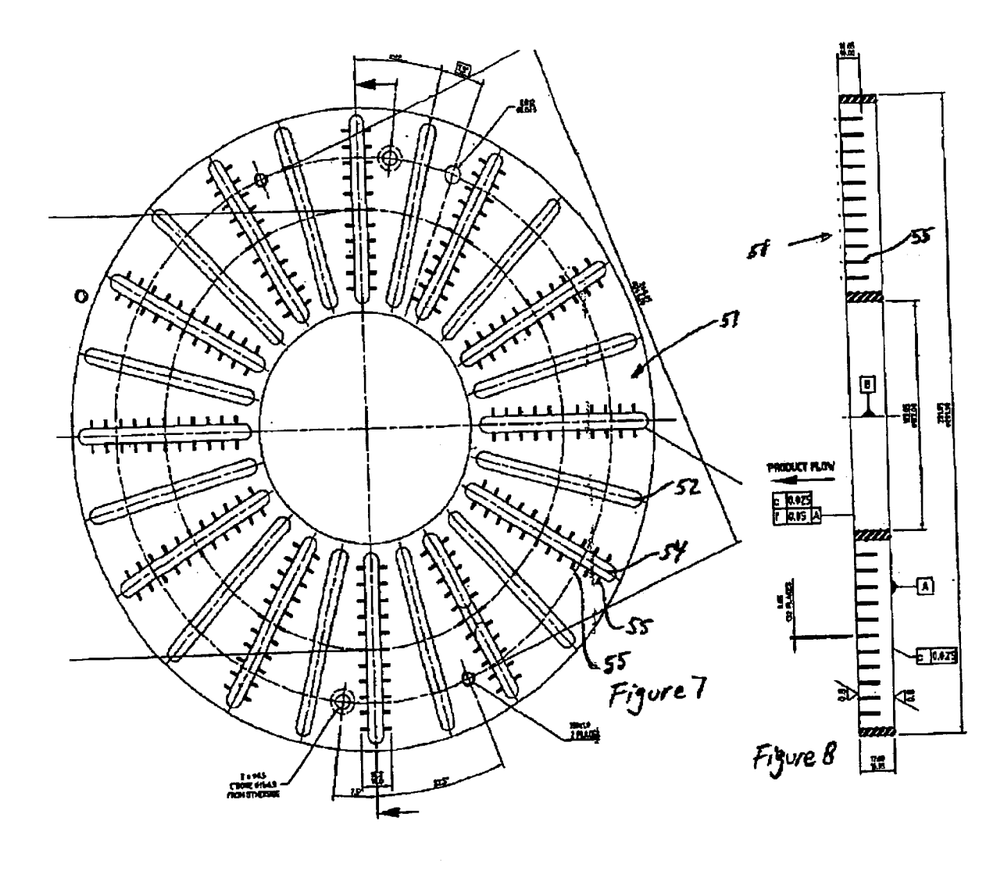
FIGS. 7 and 8 are a plan view and longitudinal section, respectively the cooling die extrusion plate shown in FIGS. 4–6

It will be appreciated that the rotatable extrusion die plate 51 can be arranged for manual displacement into its different operational positions, or, alternatively, a suitable motorised drive train may provide such positioning FIGS. 5 and 6 illustrate at reference numeral 61 a mounting plate which carries a wheel mounting block 62 supporting an externally toothed wheel 64 that runs in a wheel track 68 coupled to the extrusion die plate 51. This drive train is coupled to motor 68 which serves to position extrusion die plate 51 in a selected one of its rotational positions. The construction drawings of FIGS. 4–8 otherwise provide details of the support structure employed in holding the extrusion die plate 51 in abutting relationship at the coolant distribution end plate 16 and the drive train employed for automatically setting its rotational position.

EXAMPLE

A meat analogue chunk having a fibrous striated structural matrix and resembling tuna white meat was prepared using extrusion apparatus and the cooling die of the present invention as follows.

The following ingredients were weighed out and blended in a ribbon blender for 2 to 4 minutes.

| Ingredient | % by weight |
| --- | --- |
| Defatted soy flour | 43.6 |
| Vital wheat gluten | 43 |
| Di-calcium phosphate | 5 |
| Flavourings | 5 |
| Vitamins/minerals | 3.4 |

The blended mixture was then metered into a twin screw extruder at a flowrate of 550 kg/hr. Water was added to the powder in the feed section of the extruder at a flowrate of 450 kg/hr, The blend was then subjected to shear and pressure within the extruder prior to exiting the extruder at a temperature of 130–140° C. The molten extrudate then entered the multi-channel cooling die, attached directly to the outlet of the extruder The multi-channel cooling die consisted of 24 individual cooling channels, each channel having cross-sectional dimensions of approximately 6–8 mm by 70–90 mm. The total length of each cooling channel was 0.7–1.2 meters. Product exited to cooling die as continuous slabs with a moisture content of approximately 48–53% and a temperature of between 90–100° C., Water was used to cool the product. It entered the cooling die at a temperature of between 5 and 15° C. via the cooling fluid distribution plate located closest to the product exit and flowed in a counter-current direction to the flow of product cooling water exited the cooling die at a temperature of between 20 and 30° C.

This strategy removes the main limitations associated with the manufacture of high moisture extruded product at high outputs, namely length of cooling die and cooling die cross-sectional design. Using a cooling die incorporating multiple cooling channels, one is able to use a cross-sectional design that produces a product with the correct visual and physical characteristics. One is also able to fix the length of the cooling die to a figure that optimises pressure drop, heat transfer area, heat transfer rate and process performance. Once the configuration for a single cooling die (or channel) is determined (based on the desired visual and physical characteristics of the final product), the number of individual cooling channels required may then be determined by the desired total output The present invention has been described in connection with certain preferred embodiments. Nevertheless the invention is not so limited and includes modifications and adaptations within the meaning and scope of the invention described herein.

The Claims Defining the Invention are as Follows:

1. A cooling die, for use in the manufacture of high moisture extruded food products, said cooling die including:
   an inlet end and an outlet end;
   a plurality of plate members stacked in plane-parallel relationship thereby to define a main body portion of the cooling die between the inlet and outlet ends;
   a plurality of extrudate flow channels extending through the cooling die from the inlet end to the outlet end and defined by individual through bores in each plate member that align when the plate members are stacked, each extrudate flow channel having a major dimension in a direction extending radially away from a longitudinal axis of the cooling die main body portion that is at least 2.5 times the width in a traverse direction of the channel;
   a plurality of cooling fluid flow channels extending through the cooling die from the inlet end to the outlet end and defined by individual through bores in each plate member that align when the plate members are stacked;
   means for connecting the cooling die to an outlet of a food extruder, a cooling fluid source and a cooling fluid receptacle; and
   product flow distribution means, located adjacent the inlet end, adapted to direct extrudate from the outlet of the food extruder into said extrudate flow channels.

2. A cooling die for extruding of high moisture extrudate food products, having a cooling die body in which are defined a plurality of extrudate flow channels extending between an inlet end of the cooling die that is attachable to an extruder and an outlet end for delivery of cooled-down extrudate, and coolant cavities located in heat-exchanging communication with the extrudate flow channels and connectable to a source of coolant, characterised in that the cooling die body consist of a plurality of thick plates having a plurality of first and second bores extending between and opening at the planar surfaces of the thick plates, and in that the plurality of thick plates are stacked plane-parallel and fastened together such that the openings of the first and second bores of adjoining plates are respectively aligned with one another, whereby the first bores form said plurality of extrudate flow channels and the second bores form a plurality of discrete coolant channels extending through the length of the cooling die body.

3. A cooling die according to claim 1 or 2, wherein the plurality of said extrudate flow channels are arranged parallel to one another and equidistantly spaced about the central axis of the die.

4. A cooling die according to claim 3 having 24 extrudate flow channels.

5. A cooling die according to any one of claims 1 or 2, wherein the radial height of each extrudate flow channel is between about 20 to 100 mm and the width of each channel is between about 6 to 10 mm.

6. A cooling die according to claim 5, wherein the height of each extrudate flow channel is about 70 mm and the width is about 8 mm.

7. A cooling die according to any one of claims 1 or 2, wherein each extrudate flow channel has a substantially rectangular or oval cross-section.

8. A cooling die according to claim 7, wherein the extrudate flow channels are of uniform cross-section along their length.

9. A cooling die according to any one of claims 1 or 2, wherein the coolant flow bores are interleaved between neighbouring extrudate flow channels.

10. A cooling die according to any one of claims 1 or 2, wherein the cooling die plate members are disc-shaped or multi-faced placed in face to face abutting arrangement thereby to form said main body portion.

11. A cooling die according to any one of claims 1 or 2, further including a die extrusion end plate with apertures, the die extrusion plate located adjacent to the outlet end and adapted to impart to the extruded food products a cross-sectional shape corresponding to the shape of the apertures of said die plate.

12. A cooling die according to claim 11, wherein the apertures of said die plate have a plurality of different cross-sectional shapes;

at least one aperture of a first cross-sectional shape is located in close proximity to at least one aperture of a second cross-sectional shape; and said die plate is adapted for movement between a first position, in which at least one of the apertures of the first cross-sectional shape is in alignment with at least one of said extrudate flow channels, and a second position, in which at least one of the apertures of the second cross-sectional shape is in alignment with said at least one of said extrudate flow channels.

13. A cooling die according to claim 12, wherein the apertures are located on the die plate such that, when in the first position, substantially all of the apertures of the first cross-sectional shape are in alignment with corresponding extrudate flow channels, and when in the second position, substantially all of the apertures of the second cross-sectional shape are in alignment with said corresponding extrudate flow channels.

14. A cooling die according to claim 12, wherein the apertures of the first cross-sectional shape are radially spaced from apertures of the second cross-sectional shape.

15. A cooling die according to claim 14, wherein each of the apertures of the first cross-sectional shape are arranged sequentially with the apertures of the second cross-sectional shape.

16. A cooling die according to claim 12, wherein the die plate includes at least one group of apertures of the first cross-sectional shape which is radially or peripherally separated from at least one group of apertures of the second cross-sectional shape.

17. A cooling die according to claim 12, wherein the die plate is mounted to the cooling die for rotation about a central axis thereof.

18. A cooling die according to claim 12, wherein the apertures of the first cross-sectional shape are elongated slits and the apertures of the second cross-sectional shape are elongated sifts having cutting elements traversing said slits.

19. A cooling die according to claim 18, wherein the cutting elements are blades or wires mounted across the respective slits in an arrangement so as to cut the extruded food product exiting the die plate into strips having a substantially square cross-section.

20. A cooling die according to any one of claims 1 or 2, further including a cutting device arranged downstream of the die plate and adapted for cutting extruded food product into desired lengths.

21. A cooling die according to claim 20, wherein the cutting device includes a rotatable blade.

22. A cooling die according to claim 2, further including a coolant supply and a coolant discharge end plate at axially opposite ends of the cooling die body, wherein the end plates include manifold conduits for supplying or discharging coolant to/from the coolant channels of the die body, as the location of the end plates dictate.

23. A cooling die according to claim 22, wherein there is incorporated an extrusion die plate at the outlet end of the cooling die body downstream of the coolant discharge end plate, the extrusion die plate having a plurality of discharge orifices of predetermined shape and configuration that are grouped and arranged to be selectively bought in axial alignment with predetermined ones of the extrudate flow channels thereby to enable extrusion of cooled-down extrudate bands having selected ones of different cross-sectional shapes in accordance with the discharge orifice shape.

* * * * *